US00RE47273E

(19) United States
(12) Reissued Patent
Geller

(10) Patent Number: US RE47,273 E
(45) Date of Reissued Patent: Mar. 5, 2019

(54) GOLD AND PRECIOUS METAL BUYING MACHINE METHOD

(71) Applicant: Gold Cube Innovations, LLC, Melbourne, FL (US)

(72) Inventor: Nakia Geller, Melbourne, FL (US)

(73) Assignee: Gold Cube Innovations, LLC, Indialantic, FL (US)

(21) Appl. No.: 15/603,679

(22) Filed: May 26, 2017

Related U.S. Patent Documents

Reissue of:
(64) Patent No.: 9,070,148
Issued: Jun. 30, 2015
Appl. No.: 13/466,647
Filed: May 8, 2012

U.S. Applications:
(60) Provisional application No. 61/618,540, filed on Mar. 30, 2012.

(51) Int. Cl.
*G06Q 30/06* (2012.01)
*G06Q 20/18* (2012.01)
(Continued)

(52) U.S. Cl.
CPC ..... *G06Q 30/06* (2013.01); *G06Q 20/18* (2013.01); *G06Q 20/4014* (2013.01); *G06Q 20/40145* (2013.01); *G07F 7/06* (2013.01)

(58) Field of Classification Search
CPC .... G06Q 30/06; G06Q 20/18; G06Q 20/4014; G06Q 20/40145; G06Q 30/0278;
(Continued)

(56) References Cited

U.S. PATENT DOCUMENTS 6,131,085 A 10/2000 Rossides ..... 705/1
6,415,271 B1 7/2002 Turk et al. ..... 705/39
(Continued)

FOREIGN PATENT DOCUMENTS

JP 59108167 6/1984
JP 59108167 A 6/1984
(Continued)

OTHER PUBLICATIONS

V. Gomathy, Fault Detection and Classification with Optimization Techniques for Three Phase Single Inverter Circuit, Journal of Power Electronics, vol. 16, No. 3, May 2016.

*Primary Examiner* — Peter C English
(74) *Attorney, Agent, or Firm* — Robert C. Kain, Jr.

(57) ABSTRACT

The machine or method buys gold or precious metal items. A housing with a vault is linked to a central office for tracking buy/no-buy sales events and uploading current exchange rate data. The item is placed on a platform leading to processing stations which weigh, image, assay and convey the item to the vault (buy) or return-route (no-buy). User display commands and offers-to-buy, capture user images, scan identity and biometric data and permit user-keyed input. A computer processor calculates a discounted market value based upon exchange rate, weight, assayed purity and discounts. A compiler stores seller's data including seller responses, images and scanner data and buy/no-buy data. An acceptance module initiates a credit event and delivers the item to the vault. A rejection module negates acceptance upon user command or if an error in gold purity, weight, discounted market value or size.

1 Claim, 10 Drawing Sheets

(51) Int. Cl.
*G06Q 20/40* (2012.01)
*G07F 7/06* (2006.01)

(58) Field of Classification Search
CPC ..... G07F 7/00; G07F 19/202; G07F 7/06; G07D 11/009
See application file for complete search history.

(56) References Cited

U.S. PATENT DOCUMENTS

| | | | | |
|---|---|---|---|---|
| 7,752,108 | B2 | 7/2010 | Pratt et al. | 705/35 |
| 7,844,547 | B2 * | 11/2010 | Amos | 705/43 |
| 8,015,089 | B1 | 9/2011 | Baya'a et al. | 705/35 |
| 8,429,021 | B2 * | 4/2013 | Kraft et al. | G06Q 20/20 705/26.1 |
| 2009/0296566 | A1 * | 12/2009 | Yasrebl et al. | 370/221 |
| 2010/0223127 | A1 | 9/2010 | Bettez et al. | 705/14.51 |
| 2010/0235270 | A1 * | 9/2010 | Baker | 705/35 |
| 2011/0047062 | A1 * | 2/2011 | Kerschner et al. | 705/37 |
| 2011/0060655 | A1 | 3/2011 | Novak et al. | 705/26.1 |
| 2011/0071668 | A1 | 3/2011 | Lin et al. | 700/232 |
| 2012/0030097 | A1 * | 2/2012 | Hagan et al. | G06Q 30/06 705/39 |
| 2012/0066095 | A1 * | 3/2012 | Wolter et al. | 705/26.63 |
| 2012/0095875 | A1 * | 4/2012 | Guthrie et al. | G06Q 30/06 705/26.61 |

FOREIGN PATENT DOCUMENTS

| | | | |
|---|---|---|---|
| JP | 2002109428 | | 4/2002 |
| JP | 2002109428 | A | 4/2002 |
| KR | 2009003231 | | 9/2009 |
| KR | 20090093225 | | 9/2009 |
| KR | 20090093231 | | 9/2009 |
| WO | WO 04/001562 | | 12/2003 |
| WO | WO 2004/001562 | A2 | 12/2003 |
| WO | WO 2011/013942 | | 2/2011 |
| WO | WO 2011/013942 | A2 | 2/2011 |
| WO | WO 2011/022424 | | 2/2011 |
| WO | WO 2011/022424 | A2 | 2/2011 |
| WO | WO 2011/078765 | | 6/2011 |
| WO | WO 2011/078765 | A1 | 6/2011 |

* cited by examiner

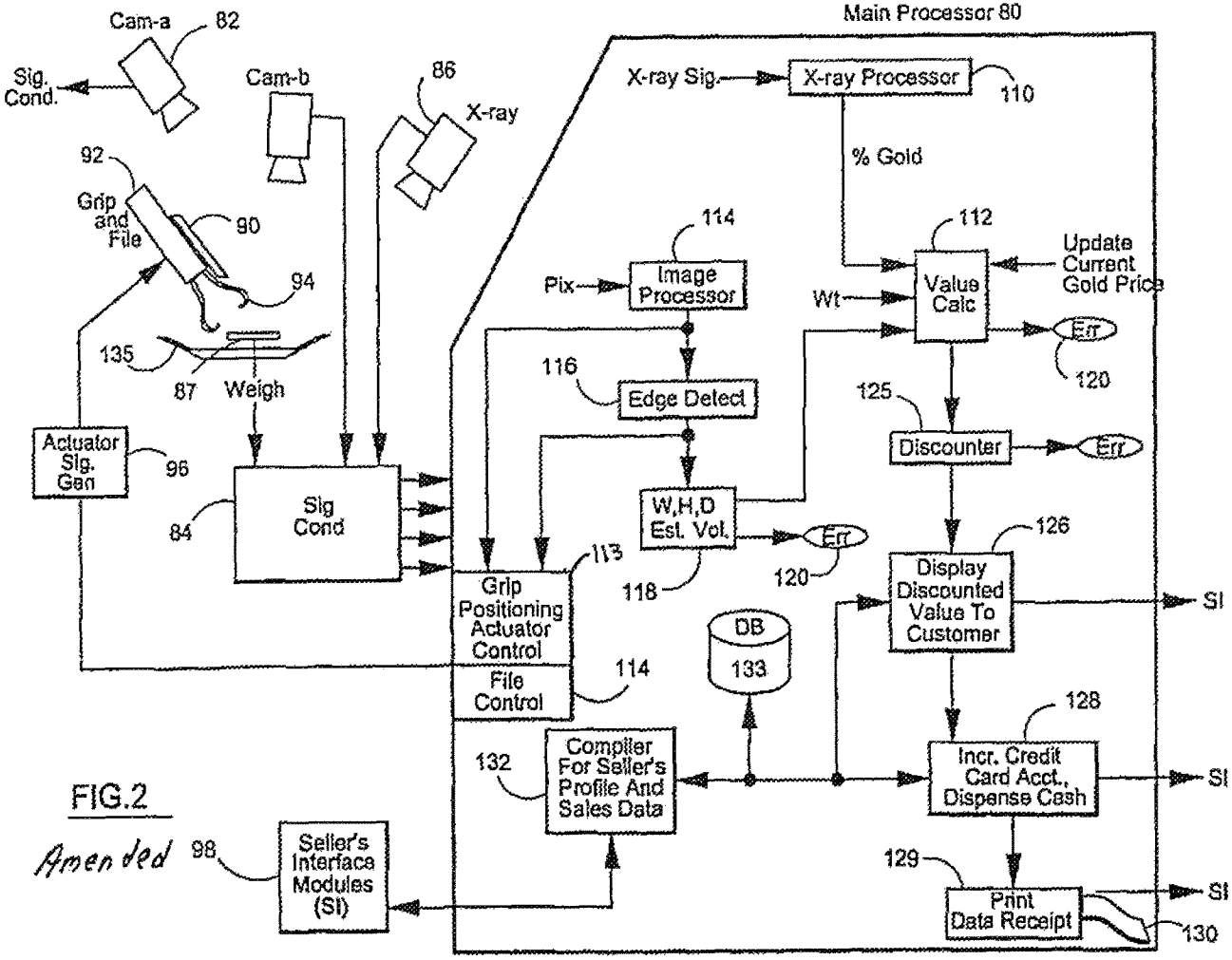
FIG.2
Amended

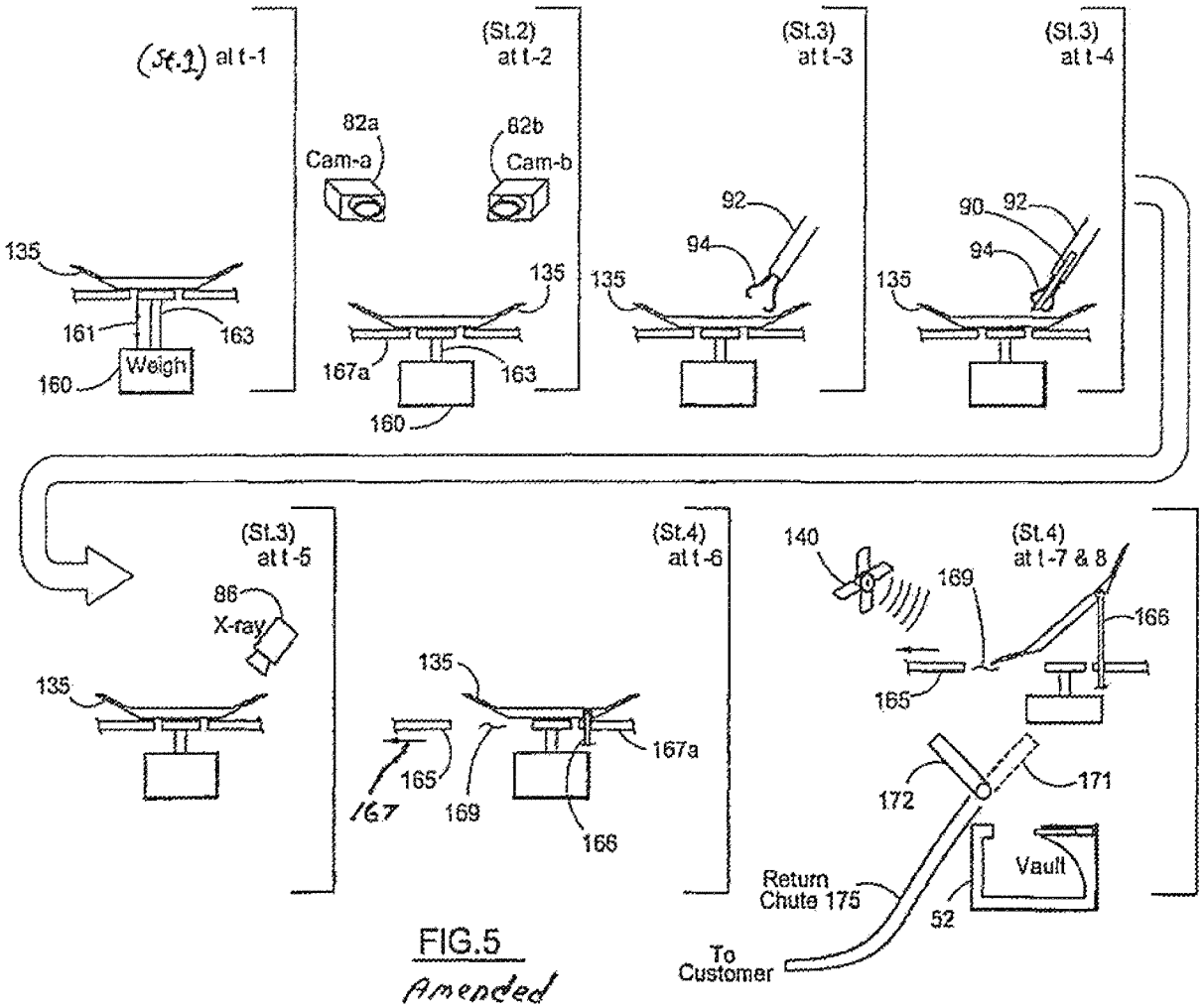
FIG.5
Amended

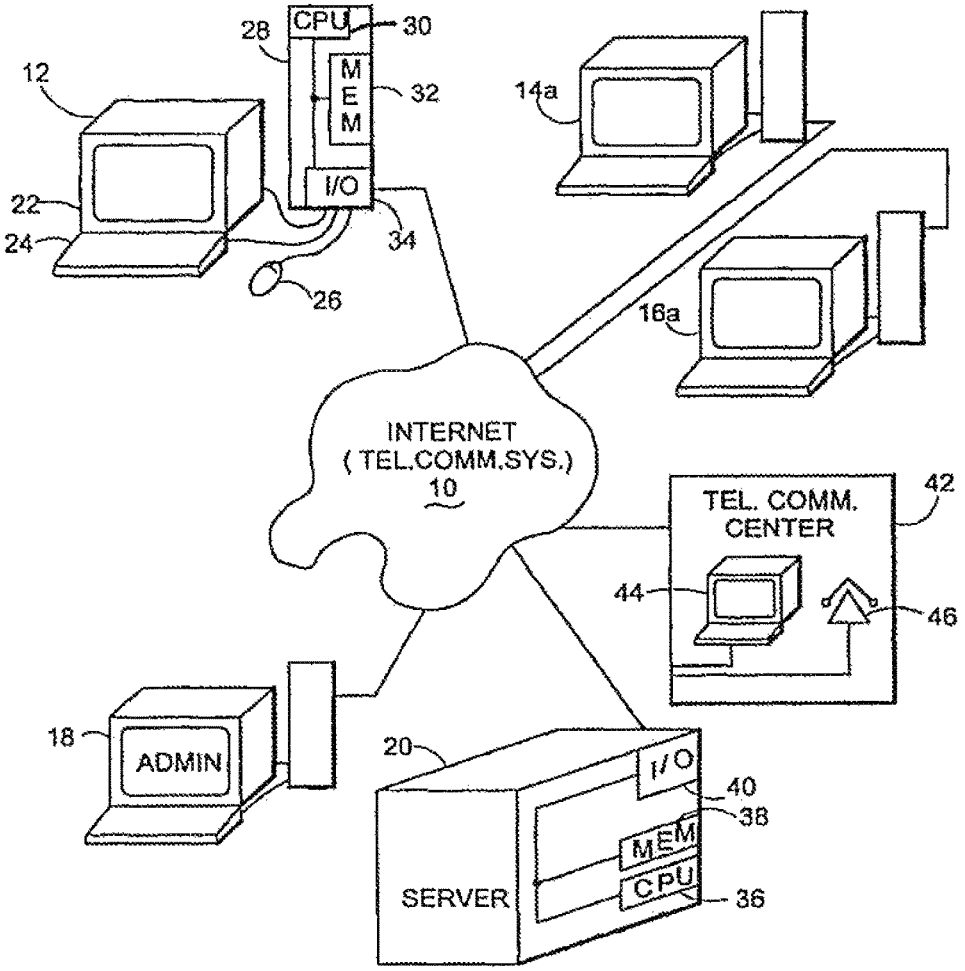
FIG.7
Amended

GOLD AND PRECIOUS METAL BUYING MACHINE METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This is a regular patent application based upon and claiming the priority of provisional patent application Ser. No. 61/618,540, flied Mar 30, 2012, the contents of which is incorporated herein by reference thereto.

The present invention relates to a gold buying and method and a precious metal buying machine and method.

Consumers and customers oftentimes have gold bearing items such as jewelry, fanciful dinner plates, coins and other items, as well as other types of items made of precious metals (silver and platinum). Some of these customers may wish to sell these items in a secure manner with some confidence that the price is based upon an exchange rate market price for the gold or the precious metal. The present invention solves this problem.

U.S. Pat. No. 7,844,547 to Amos discloses a kiosk permitting consumers to buy and sell gold. The kiosk has a receiving slot for gold bullion and gold coin. Gold and jewelry placed in the kiosk can be assayed with electrical and thermal conductivity, MRI or X-rays. However, Amos does not give further details of how the assay process is done on the gold and jewelry.

Published PCI Patent Application, WO 2011022424 to Kerschner discloses a system for managing gold bullion transactions at a consumer-operated kiosk by paying a transaction price when receiving authenticated gold bullion or when gold bullion is sold to a customer.

Published Japanese Patent JP 2002109428 discloses a gold exchange that exchanges gold of predefined weight for currency, and connecting the gold buying machine to a central office to determine the market price of gold at the time of settlement.

Published Japanese Patent JP 59108167 discloses unattended ATM machine with access chamber for gold bullion.

U.S. Pat. No. 6,415,271 to Turk et al, discloses asset-based electronic cash system for financial transactions whose total value is equal to the stored amount of valuable commodity.

U.S. Pat. No. 7,752,108 to Pratt et al. discloses asset-backed purchasing module to debit the consumer account by selling quantity of asset backing purchase account balance to house account.

Other U.S. patent and patent application references that may be relevant are: U.S. Pat. No. 6,131,085 to Rossides entitled Answer Collection and Retrieval System Governed by a Pay-Off Meter; U.S. Pat. No. 8,015,089 to Baya'a et al. entitled System and Method for Providing a Pre-Paid Commodity-Based Credit Account; U.S. Published Patent Application No. 2011/0071668 to Lin et al. entitled Vending Machine Monitoring System and Its Monitoring Method; U.S. Published Patent Application No. 2011/0060655 to Novak et al. entitled Currency Market Utilizing Precious Metals and Gemstones; U.S. Published Patent Application No. 2010/0223127 to Bettez et al. entitled Method and Apparatus for Managing Shipping and Advertisement Information in a Communications environment; Korean Published Patent Appln. KR 20090093231; Korean Published Patent Appln. KR 20090093225; Published PCT Patent Application, WO 2011078765 entitled Interactive Kiosk; Published PCT Patent Application, WO 2011011942 entitled Automatic Gold Bar Vending Machine; and Published PCT Patent Application, WO 2004001562 entitled Systems and Methods for Storage of User Information and for Verifying User Identity.

OBJECTS OF THE INVENTION

It is an object of the present invention to provide a gold buying machine capable of buying a number of gold bearing items and a similar machine for buying items containing other precious metals. A method is also presented herein.

It is a further object of the present invention to provide a gold buying machine which presents the price or offer to buy prior to the consumer accepting the offer.

It is another object of the present invention to provide a gold buying machine and a method and a precious metal buying machine and method wherein the offer to buy presented to the consumer is based upon the exchange rate market price less a transaction or discount fee. The transaction fee accounts for size, weight and volume errors, the presence of jewels, as well as fraud, theft and other system costs.

It is another object of time present invention to provide a gold buying machine and as precious buying machine which reduces fraud by capturing user supplied data based upon questions presented to the user at the seller interface module. The seller's interface module includes a display screen, keypad, fingerprint reader, multiple cameras, credit card and driver license readers, and audio announcer systems. Voice print recorder may also be used.

The system is also programmable to capture customer data based upon local ordinances governing pawn shop operations.

SUMMARY OF THE INVENTION

The machine and the method for buying gold-bearing items (or other items made of precious metal) from consumers includes a secure housing with an internal vault. The machine is coupled via a telecommunications link to at central office which tracks the purchase of gold-bearing items at the machine and tracks related transactions (attempts to sell gold items at the machine) and provides updates relative to the exchange rate market price data for gold. The housing includes a portal leading inboard to a processing platform which holds the gold or precious metal bearing item. A plurality of processing stations are disposed in the interior of the housing. A lock-out door closes the portal during item processing.

The plurality of processing stations include: a weigh station to weigh the gold-bearing or precious metal-bearing item, an imaging station for capturing images of the item, an assaying station for testing a purity of gold in the item, and a conveyor or routing transport system for delivering a purchased item to the vault. The weigh station, imaging station and assaying station respectively generate representative signals for weight, item images and assaying data. A plurality of seller interface modules are disposed on the exterior of the housing including a display, an imaging system to capture one or more images of the seller, at least one scanner for obtaining seller's identity and biometric data, a keypad input interface and a bank card reader adapted to read the seller's bank card. The seller's bank card is linked to the seller's account which, if the sale is consummated, is credited after the gold-bearing item is deposited in the vault.

A control computer processor electronically obtains the respective weight, item images and assaying signals from the processing stations. The processor is mounted in the secure housing. The control processor includes: a communicator for facilitating communication with the central office to obtain current exchange rate data for the gold; as calculation module for determining a discounted market value for the gold-bearing item based upon the exchange rate data, and the weight signals, a purity based upon the assaying data, and the discount factors; and an interface for activating the user's display. The display shows instructions to the user regarding acceptance and rejection of the offer to buy, and the offer to buy the item at the determined or calculated market value (discounted from the calculated exchange rate value).

A compiler operative with the processor stores seller's data obtained from the seller interface modules including seller responsive data (responsive to the displayed offer to buy), seller images and scanner data for seller's identity and biometric data. The compiler also stores transactional data. An acceptance module initiates a credit event for the seller's account based upon the seller's confirmation of sale. The conveyor or router delivers the purchased item to the vault in the secure housing. If the user does not sell the item (rejects the offer to buy), a rejection module negates the acceptance module. A rejection also is initiated when an error signal is detected. An error module generates an error signal based upon one or more of: a gold purity fault, a weight fault, a discounted market value fault, and an item size fault. The rejection module facilitates the return of the item to the user.

BRIEF DESCRIPTION OF THE DRAWINGS

Further objects and advantages of the present invention can be found in the detailed description of the preferred embodiments and in the illustrated drawings of the preferred embodiments of the invention.

FIG. 2 diagrammatically illustrates other functional modules in the gold buying and precious metal buying machine;

FIG. 5 diagrammatically illustrates time based processing of the item subject to the potential purchase;

FIG. 7 diagrammatically illustrates the computerized network which is tied to the gold and precious metal buying machine.

DETAILED DESCRIPTION OF THE PREFERRED EMBODIMENTS

The present invention relates to a gold buying and precious metal buying machine and a computerized system for tracking the sales and updating buying parameters in a plurality of remote buying machines. Although reference is made herein to a "gold buying machine" or "GBM" the machine, system and process can be employed with other previous metals. Therefore, the reference to a "gold buying machine" or GBM is not limited to gold items but the GBM also operates on precious metal items.

The general features and functions of the GBM machine are as follows. (1) Customer places gold-bearing item ("gold") into a Gold Buying Machine ("GBM"), a solid, secure machine like an ATM or automatic teller machine; (2) Gold is dropped or shuttled to a "Weigh+Exam" plate or bowl; (3) At the W-E station or stations, the gold is weighed and a x-ray image or images are obtained of the gold piece. Prior to the x-ray analysis, the piece is grabbed or gripped, and then a jeweler's file is used to make a small cut on the surface of the piece. The x-ray gun and x-ray processing system uses the small file slot to detect the percent % gold of the piece under study; (4) The x-ray is used to assay the gold. A computer algorithm (i) obtains current local price per weight (14K standard) (Internet access); (ii) the computer system or processor in GBM calculates the price of the gold accounting for % gold per unit weight; (iii) the GBM computer discounts "offer to buy gold" to account for transaction costs, fraud, commissions, etc.; (iv) GBM machine displays the discounted "offer to buy" gold and customer accepts/declines offer. If a BUY, GBM machine dispenses cash or initiates a credit event (issues credits) on a customer's debit card or credit card. GBM then places the gold piece or item in a secure vault in the interior of the GBM. If NO BUY, then GBM returns item to customer; (5) The GBM has the following data processing items: (i) obtain customer fingerprint, photo and scan customer id, such as a driver's license; (ii) obtain customer profile data (requires data input from customer); (iii) customer completes local law "gold purchase" log sheet (Q: is gold stolen?; are you a felon?, etc); (iv) large gold items rejected (returned) to customer as "too big"; (v) thick gold items rejected (returned to customer) due to "fraud by weight" tricks.

Figure 1:
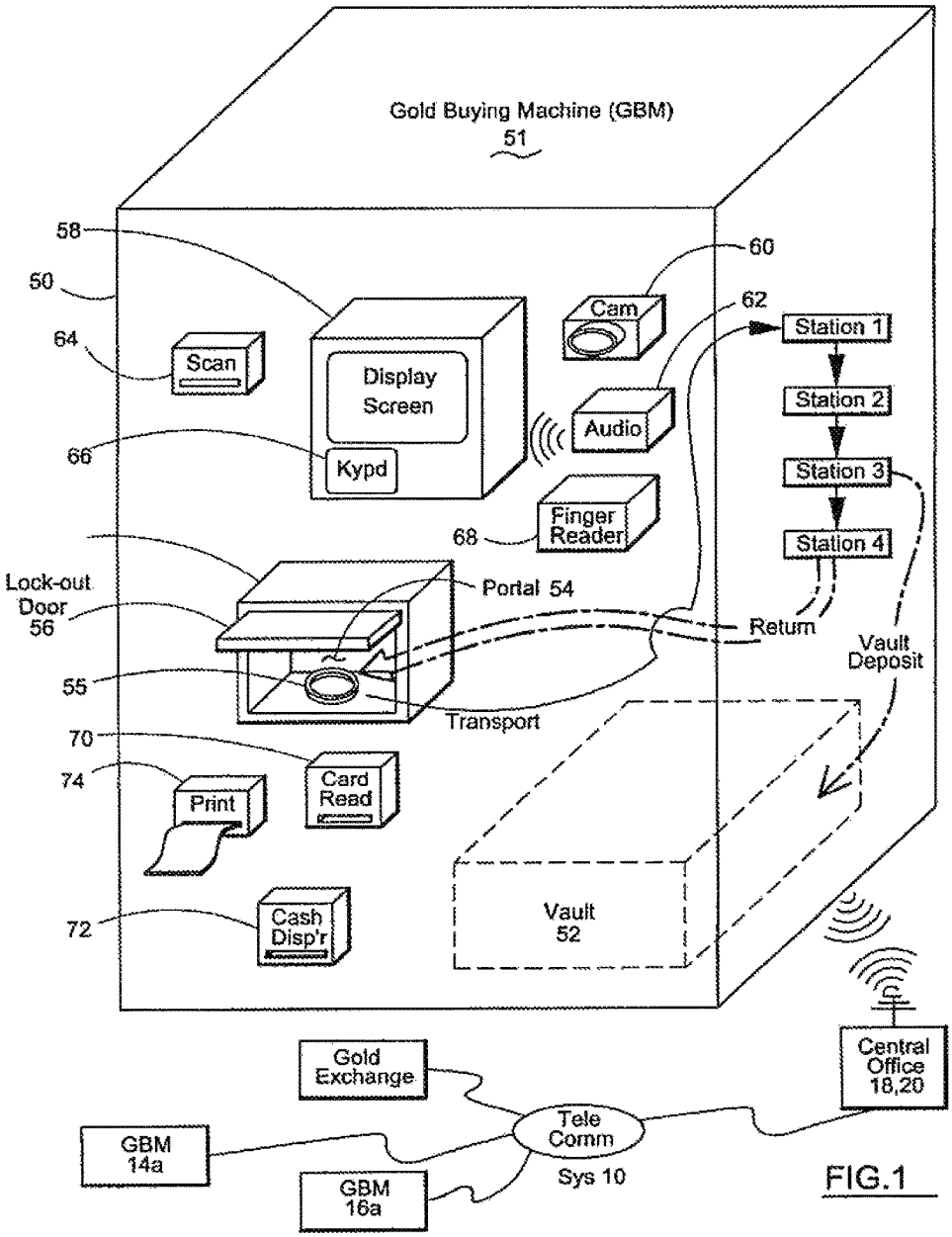
FIG. 1 diagrammatically illustrates the gold buying and precious metal buying machine with operational modules.

FIG. 1 diagrammatically illustrates a gold buying machine GBM 51 which can also be configured as a precious metal buying machine. Housing 50 is designed to be secure and difficult to break into. Vault 52 is disposed in an interior location within housing 50. Housing 50 includes an opening or portal 54 into which a consumer or user places an item 55 subject to a potential purchase. Portal 54 has a lockout door 56 which closes and thereby secures item 55 within the machine for processing. The door closes before any processing function.

Machine 50 includes a plurality of seller interface modules. Examples of these modules includes display screen 58, a camera 60 which captures an image or images of the seller (multiple cameras may be used), an audio announcer or speaker 62, an identity (Id.) card scanner 64, a keypad 66 which permits the user to input items and a fingerprint reader 68. Keypad 66 may be a discrete unit or may be part of a touch screen display as part of display screen 58. Scanner 64 is configured to scan various seller identity cards (driver's license) as well as a seller's bank card. Reference to a "bank card" includes a credit card, debit card or any other financial card issued by a financial institution. From an operational standpoint, a seller's account associated with a bank card will be credited at the time of sale of the item by GBM buying machine 51.

The seller interface module may also include a separate credit card or bank card reader 70, a cash dispenser 72 and a printed material dispenser 74. All these items are explained later in their operational setting. The primer 74, display 58, camera 60 and user input (66 or touch screen 58) are important parts of the seller interface module group.

Once gold or precious metal bearing item 55 is placed on a processing platform within housing 50, in one embodiment, the item 55 is transported to a variety of processing stations, stations 1, 2, 3 and 4. Reference is made herein to "gold bearing item" but this reference also covers other precious metal items. If the consumer does not accept the offer to buy, item 55 is returned as noted by the return path of the dash dot dash double lines. If the seller agrees and confirms the sale, the item 55 is delivered to vault 52 within buying machine 51.

In order to provide up to date data regarding exchange rate market prices and in order to track transactions, buying machine 51 has a telecommunications link with central office 18, 20 (described in the summary in connection with FIG. 7 that follows). Central office 18, 20 is coupled to telecommunications system 10 and other GBM machines 14a and 16a. Further, the telecommunications system 10 is coupled to a gold exchange data center which generates exchange rate market price data for the system. Of course, rather than having a gold buying machine, the machine may be expanded to include other precious metals.

FIG. 2 diagrammatically illustrates certain hardware and electronic modules utilized by buying machine 51.

Main computer processor 80 is disposed inside housing 50. Various signals from camera-A, identified as camera 82, as well as the output signals from camera-B are fed to signal conditioner 84. In order to assay the item and determine the amount of gold and other precious metal, an X-ray imaging system 86 is utilized. The output from X-ray system 86 is fed to signal conditioner 84. In order to convert and obtain the market value of the item under study, the item is weighed as noted by weigh scale or weighing device 87. The output from weight scale 87 is applied to signal conditioner 84. By using X-ray imaging system 86, the item under study is first gripped and then a small slot or groove is filed in the item. A jewelers file 90 is deployed on the grip and file module 92. Grip elements 94 initially grip the item and file 90 is then moved across and over the item. Thereafter, X-ray sub-module 86 takes an X-ray picture and generates assay data signals which are applied to signal conditioner 84. The grip and file unit 92 is controlled by an actuator signal generator 96. Generator 96 controls the grip action and the file action. Robotics modules are employed in this manner. With respect to main processor 80, the processor obtains many of the inputs from the seller interface [module 89] *modules 98*. Processor 80 interacts with [module 89] *modules 98*. As explained earlier, [this module 89 includes] *these modules 98 include* display 58, keypad 66, ID scanner 64, fingerprint reader 68, camera 60, audio speaker 62, printer 74, bank card reader 70 and potentially cash dispenser 72. The inputs and control of the seller interface [module 89 is] *modules 98 are* established by main processor 80.

Outputs from signal conditioner 84 are fed through various functional modules. The functional modules may be software, hardware or a combination. X-ray processor 110 obtains the X-ray signal from conditioner 84 and determines the percentage gold by a known method. Value calculator 112 accepts as an input the percentage gold factor (potential a carat signal), as well as the weight signal from weigh station 87. Further, value calculator 112 obtains an update for the exchange rate market price for the gold piece or precious metal piece. As explained later, this is generated from the central office. Image processor 114 obtains gold bearing item 55 images PIX from camera CAM-A and CAM-B as well as seller interface camera 60 (FIG. 1). These images are processed. Particularly an edge detection routine 116 processes the image of the item 55. The edge detection is used in robotics control (grip and file 92) and item volume calculations. In module 118, an estimate volume is computed based upon item images. The width, height and depth of the item is studied, detected and processed to obtain an estimated volume value. Other image processing techniques may be used to detect width, height and depth, as well as the volume of item 55. The cameras may be visual, IR or uv. The x-ray image may be used for volume calculation and robotic control. If the item is too small, an error signal by processor 80 is generated as noted by error module 120. If the item 55 is too large either by weight, height, width or depth, an error signal is generated. These error signals are stored in the database *133* along with the seller information. This is part of the anti-fraud prevention of the present invention (especially for weight fraud). Other image processing techniques may be employed such as a color filters in order to locate the edges and determine depth or identify jewels. Further, a number of cameras may be employed rather than one or two as shown in the drawings in order to obtain a complete picture of the item subject to the sell. In a customer dispute, these images are useful for dispute resolution.

Processor 80 includes a grip positioning and an actuator control [112] *113* as well as a file control 114. The output from grip actuator control [112] *113* and file control 114 is applied to actuator signal generator 96 and ultimately the commands to grip the item and file the item are applied to grip and file module 92. The commands initiate from the processor.

Once the item under study has a small slot file on it, an X-ray image is taken and this data is ultimately applied to value calculator 112. The value calculator is a determining device for determining the discounted market value for the gold bearing item based upon the exchange rate data, the weight signal obtained by weighing the item, and the purity based on the assaying data from module 110 and further discount factors. These further discount factors include transaction fees, fraud related discounts and other items discussed later herein. For example, the presence of non gold elements (jewels) on a gold plated bearing item increases the discount fee. Additional image processing may be employed by main processor including the use of color detection and color filters and imaging algorithms known to persons of ordinary skills in the art.

As an example of fraud, if the estimated volume, coupled with a gold weight per volume factor (multiple factors for 14K, 12K etc.) reveals a result which is significantly different (beyond a differential threshold) than the actual weight of the item, that is an indication of fraud by the consumer. For example, lead is heavier than gold and this error is detected by the GBM. In such a situation, the error routine 120 is activated and the item is returned to the user. Otherwise for a buy cycle, discount unit 125 applies the discount to the true or actual exchange rate market price of item 55. This discount may be permanently stored in buying machine 51 or may be supplied periodically by central office 18, 20. There may be a table of discount factors accounting for size, weight, purity, number of jewels, etc. or a discount matrix (weight vs. category (size, type of item (see list)) vs. assayed purity) may be used. Module 126 displays the fully discounted offer to buy to the customer. Typically, this display occurs on display screen 58. If the customer confirms the purchase via keypad 66 or other mechanism, the system affects a credit to be issued to the seller's account linked to the seller's bank card. Module 128 recognizes that there is an incremental credit applied to the credit account of the user or the seller. In some situations, GBM 51 may pay out cash from cash dispenser 72. Module 129 recognizes that a print receipt 130 documents the transaction for the customer. With respect to the display discount value, display incremented credit account, and print, those data functions are all applied by processor 80 to seller interface *modules* 98 described earlier in connection with FIG. 1.

However, prior to presenting an offer to buy, the seller must input significant information about himself or herself into GBM 51. Compiler unit 132 gathers all the seller's profile data, from ID scanner 64, fingerprint reader 68, keypad 66 and others. The data is stored in a compiler [data base] *database 133* or memory unit. Further, the buying machine 51 may display questions on display screen 58 which are compelled by the federal or local government. For example, questions regarding: "Is this a stolen item? Are you a convicted felon? Has this item been previously sold to a pawn shop?" are all potential government required questions. The seller's responses are collected via a keypad or other mechanism and ultimately are stored in compiler 132.

Figure 3:
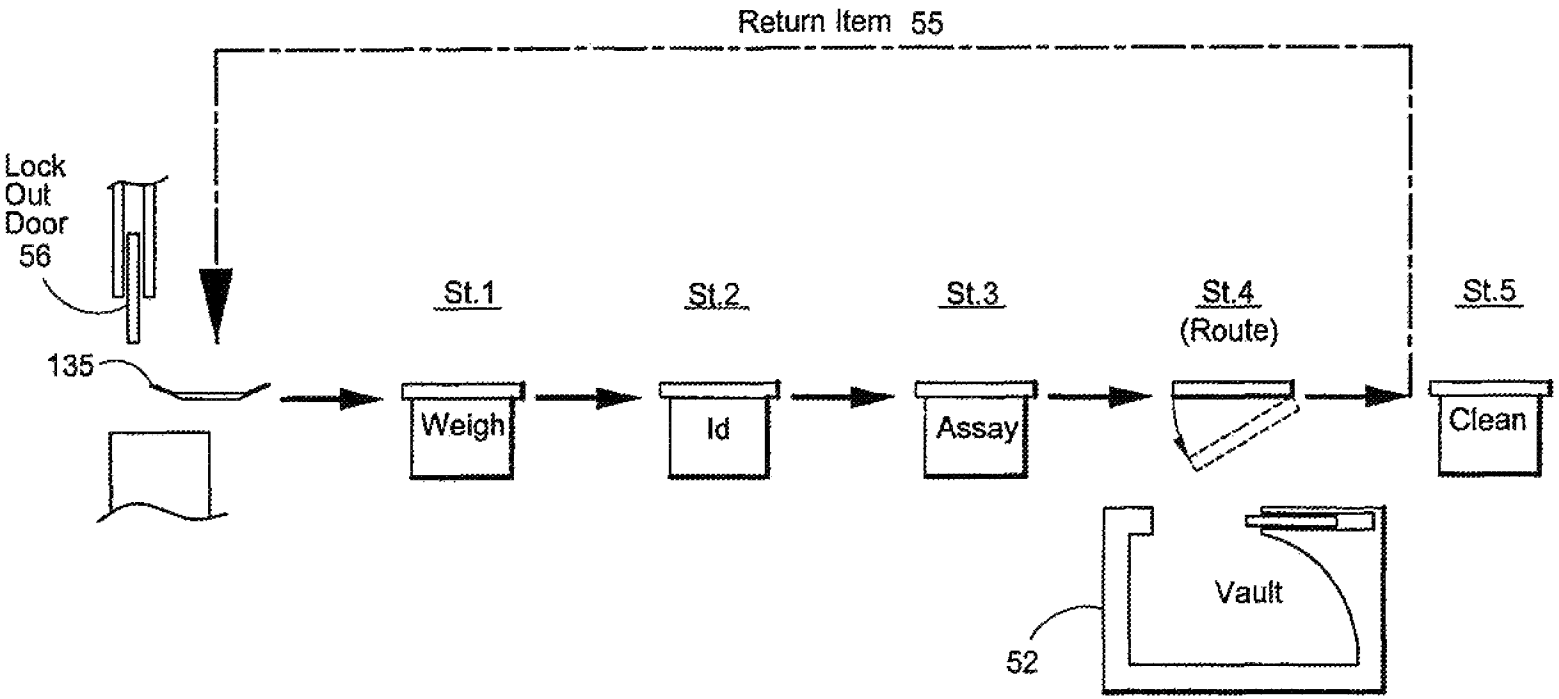
FIG. 3 diagrammatically illustrates stations which process the item subject to the purchase.

FIG. 3 diagrammatically shows one methodology for operationally processing the item 55 subject to the transaction. Once door 56 is opened (door 56 is normally closed), the user can place the item subject to the potential sale onto a processing platform 135. This processing platform 135 may move through a defined track within housing 50. Station 1 is a weigh station. Station 2 identifies the item subject to the purchase. Station 3 is an assay station where the gold value or other precious metal value is determined. Station 4 is a routing station wherein either the item is placed in vault 52 or the item is returned by return item path to the portal 54 and lockout door 56. Generally during processing, lockout door 56 is closed. Once the item is returned, door 56 is open and the user can withdraw the item from the machine. Step 5 is a cleaning station such that gold dust or other material caused by creating the small slot in item 55 is removed from the processing platform 35.

Figure 4:
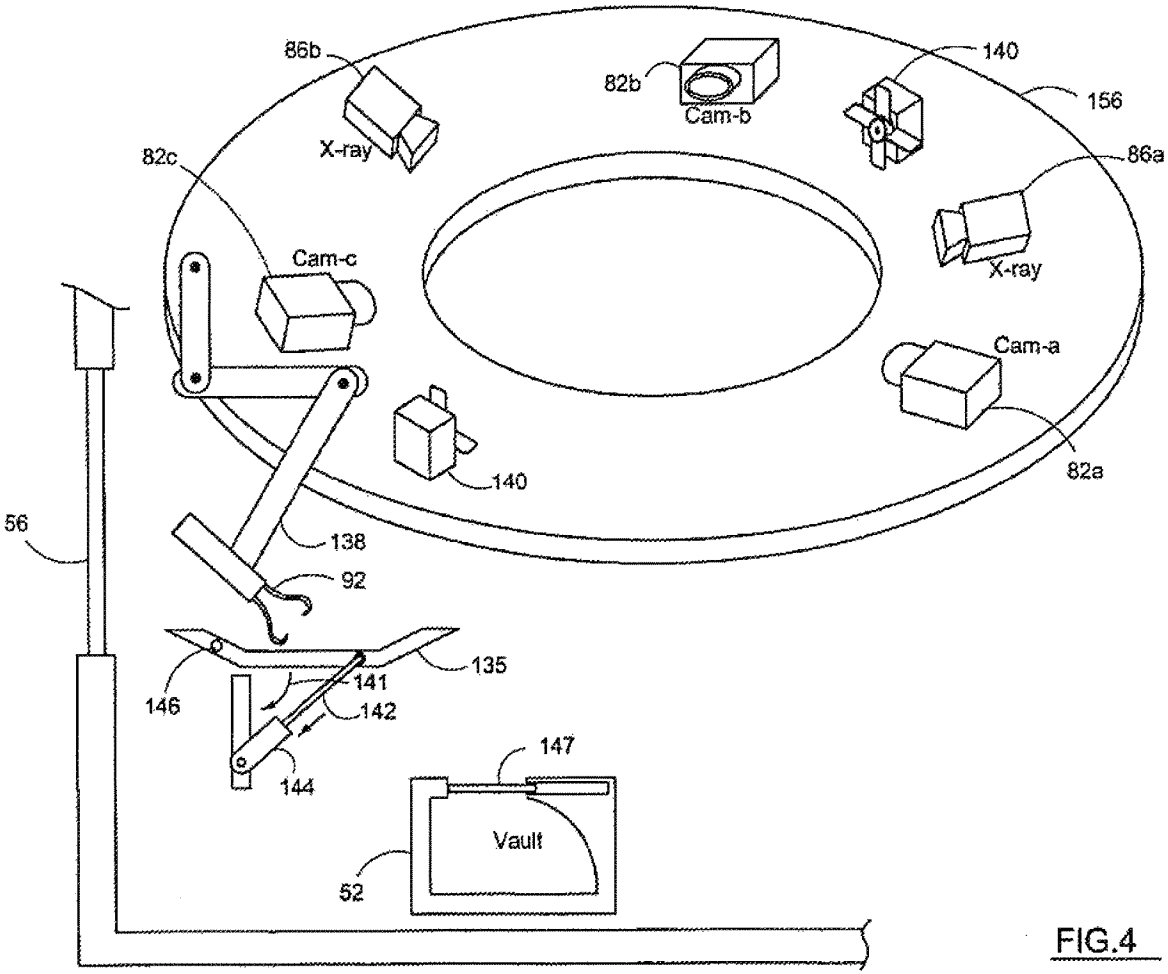
FIG. 4 diagrammatically illustrates a different configuration for the stations wherein the item is stationary.

FIG. 4 shows a different configuration for the processing stations. Other processing methods, different than FIGS. 3 and 4, may be used. In FIG. 4, processing platform 135 is near lockout door 56. In FIG. 4, the working modules are mounted above *a* plate *of processing platform* 135 on an elevated operating platform 156. Typically, grip and file unit 92 is disposed well above lockout door 56 by withdrawing articulating ars 138. Above the operating theater of processing platform 135 is a plurality of items including item cameras 82a, 82b and 82c. Further, two X-ray imaging systems 86a, 86b are utilized. In order to clean the processing platform 135, clean air blowers or fans 140 are disposed above on platform [track] 156. In order to deliver the item to the vault, platform 135 rotates downward as shown by arrow 141. This is caused by actuator arm 142 being drawn into actuator body 144. Processing platform 135 rotates as shown by arrow 141 about pivot point 146. Any item 55 on the platform will be dropped into the interior of vault 52 while the vault door 147 is open. The elevated operating platform [track] 156 may be stationary or may rotate to better position the functional modules near item 55 on platform 135.

FIG. 5 diagrammatically illustrates the process and the stations spaced apart in time rather than physically spaced apart. Station 1 at time t-1 notes that processing platform 135 retains the item 55 (not shown) and weigh module 160 is weighing the goods 55. The weigh platform 163 for weigh module 160 is raised to [weigh] *processing* platform 135 [and] *carrying* item 55 by up and down movement 161 of weigh module 160. At station 2 at time t-2, images of the item 55 are taken by cameras 82a, 82b. At that point, the plunger *on weigh platform* 163 for weigh unit 160 has been retracted below the plane established by base 167a.

At station 3 and time t-3, the imaging cameras are used to guide the grip unit 92 to a position close to the item (not shown) such that grip arms or fingers 94 can grip the item. At station 3, time t-4, a jewelers file 90 is utilized to file a small slot in the jewelry piece of the study. File 90 moves back and forth [as shown by arrow 139].

[A] *At* station 3 at time t-5, an X-ray image by X-ray camera 86 is taken. The image is taken of the slot created by the jewelers file in order to determine the quality of gold in the item (carat value). The slot enables the jeweler and the X-ray gun 86 to penetrate the surface in order to determine how deep the gold is and hence how valuable the item is. Also, the filing operation identities gold plated items.

At station 4, time t-6, the assay step has been completed and the user has confirmed the sale to the system operator of GBM 51. The system operator is the party operating the buying machine 51. In one embodiment, a lower support wall 165 is moved as shown by arrow 167 leaving a space 169 open. A pin or rod 166 is raised above the [support platform] *base* 167a thereby lifting one end of [operating] *processing* platform 135.

At station 4, time t-7, processing platform 135 has been fully extended to a near vertical position due to the upward movement of push rod 166. Space [170] *169* has been opened in the base platform to permit the item under study (the assayed piece) to fall down into a routing system created by route lever arm 172. As shown in FIG. 5, route door or arm 172 causes any item passing through opening space [170] *169* to fall into vault 52. In another mode of operation, wherein route door 172 moves to the dashed position 171, the item under study is transported via return chute 175 to the customer. Vault 52 has a door which is opened upon extension of rod 166 and closed upon delivery of item 55 in the vault space. Imaging cameras may confirm delivery of the item into the vault.

Figure 6A:
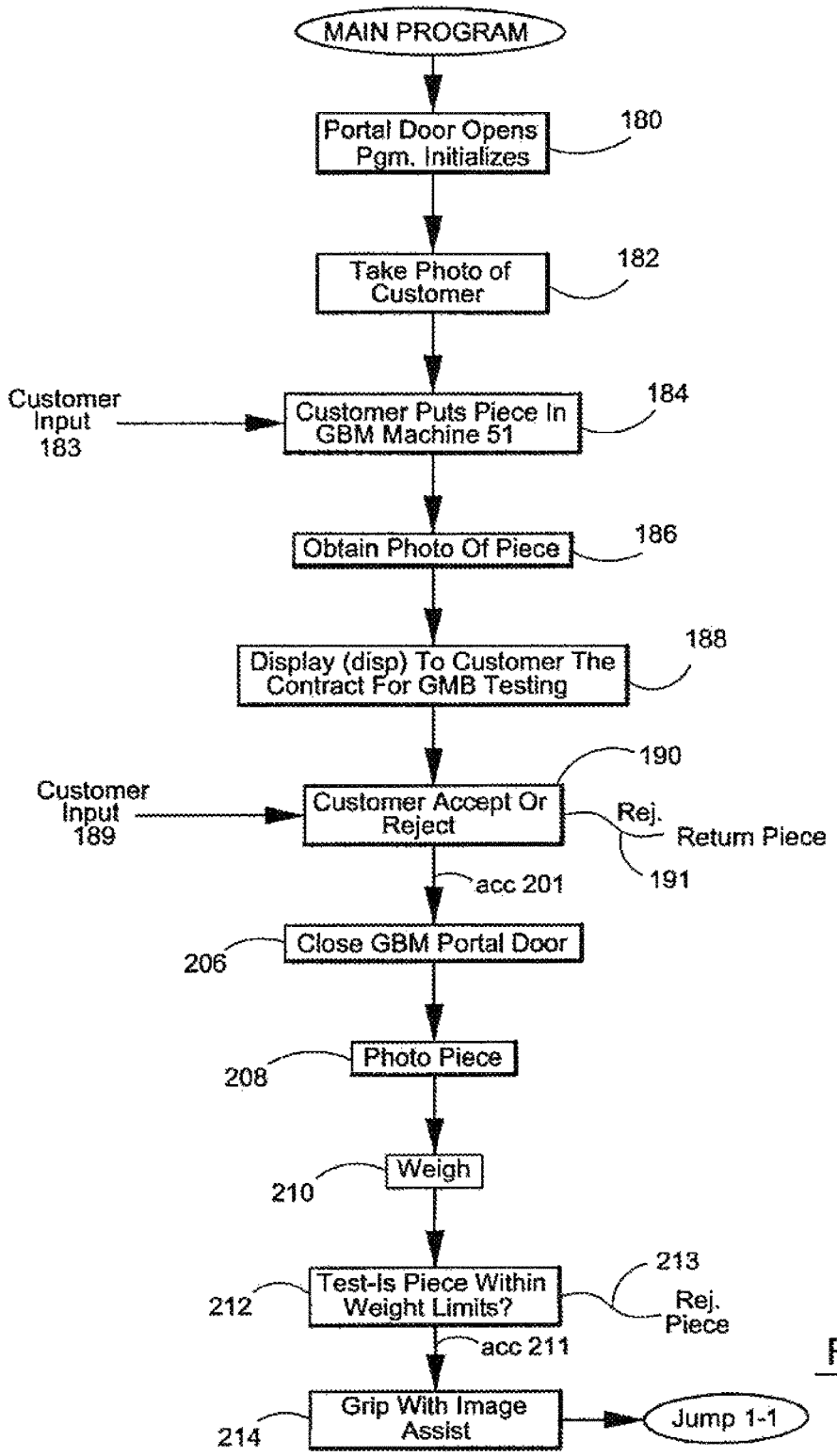
FIGS. 6A-D diagrammatically illustrate several operational flowchart.

FIG. 6A diagrammatically illustrates functional operational blocks for the general operation of the present gold and precious metal buying machine and method. The flowchart consists of FIGS. 6A, 6B, 6C and 6D. The program elements are linked together by jump points 1-1, 1-2 and 1-3 in the various figures.

In step 180, the program initializes and the portal door 56 opens. In step 182, a photograph or image of the customer depositing the item under study 55 into the portal 54 is taken. In this manner, anti-fraud provisions are developed by the program, machine and method. In step 184, the customer puts the piece under study in the gold buying machine (GBM machine) that is, gold and precious metal buying machine 51. A customer input 183 is noted as the customer deposits item 55 into the operating platform through portal 54. In step 186, the system obtains an image or photo of the item. This is used in order to avoid fraud and to further document exactly what is placed in the machine for assaying. The image is stored with the customer profile ID data. Step 188 displays to the customer the contract for the GBM testing. As noted earlier, the piece under study is slightly altered in order to determine the gold or precious metal content. The customer should agree to the GBM contract before such activity. Step 190 accepts customer input [181] *189* wherein the customers accepts or rejects the contract. If rejected, step 191 returns the piece to the customer by opening lockout door 56. Earlier, immediately after step 184, the lockout door 56 would be closed thereby securing the piece within machine [50] *51*. If, in step 190, the customer accepts the contract, the acceptance path 201 is followed and, in step 206, the machine closes lockout door 56. As described earlier, this could be an alternative to closing the lockout door after step 184. In step 208, the machine takes another image of the piece under study. Step 210 involves obtaining the weight of the item under study. Step 212 is a test to determine whether the piece under study falls within weight limits. These minimum and maximum weight limits are discussed later. If the piece under study is not within the minimum and maximum thresholds or predetermined limits, rejection REJ step 213 is engaged and the piece is returned to the customer. If the piece under study falls within the minimum and maximum weight limits, acceptance ACC path 211 is followed. In step 214, the machine grips the item with assistance of the image.

With a high quality image and, more importantly, multiple images of the item under study taken by several cameras in the machine, computer program software and hardware can detect the edges of the image and the shape of the image. A computation of shape and size and volume can be made. The volume may be estimated since the discount rate accounts for volume errors. With the computation of shape and size, a mechanical arm can be directed to grab the piece or grab several segments of the piece under study in order to secure the piece for the filing operation.

Figure 6B:
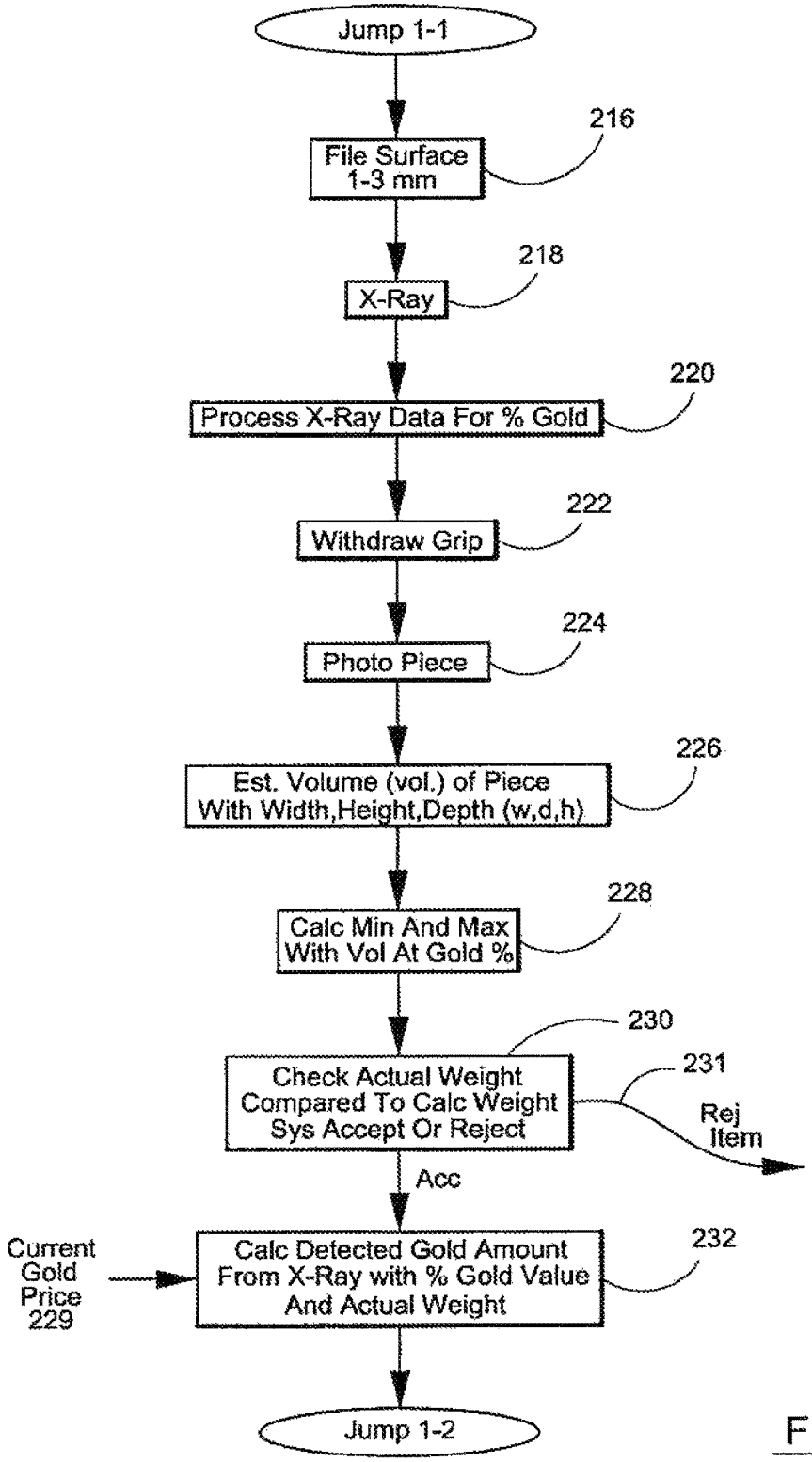

FIG. 6A is joined to FIG. 6B at jump point [1-2] *1-1*. In step 216, the machine and method uses a small jewelers file to file a 1-3 mm. slot or groove of the piece under study. Step 218 x-rays the piece. Step 220 processes the x-ray data and determines the percentage of gold or other precious metal of the piece under study. This is an assaying step. Step 222 withdraws the grip which retains the piece during filing operation. Of course, the grip may be withdrawn prior to x-ray step 218 and assay 220. In step 224, another image or multiple images of the piece are obtained. In this manner, the customer and the system operator has pre-assay pictures and post-assay pictures of the piece strider study. In step 226, the computer program can estimate the volume of the piece by determining, through edge detection and image processing, the width, height and depth (W, H, D) of the item. In step 228, the system calculates the minimum and maximum volumes for the item *and* the percentage of gold with the x-ray assay data. The percentage of gold can be estimated at 14K, 18K and 12K [dependant] *dependent* upon the assay data. In step 230, the estimated weight given the [estimate] *estimated* volume multiplied by the predetermined gold [percentages] *percentage* is checked against the actual weight. If the actual weight of the piece varies considerably beyond the 12K, 14K and 18K estimated volume-weight, the system rejects the item in step 231. If the actual weight of the item falls within the estimated thresholds, the acceptance path leads to step 232. In step 232, the system calculates the actual gold amount from the x-ray based upon the assayed percentage of gold and the actual weight. Also, the machine and method accepts information regarding the current market price of the gold by input 229. FIG. 7 shows the market data update system.

Figure 6C:
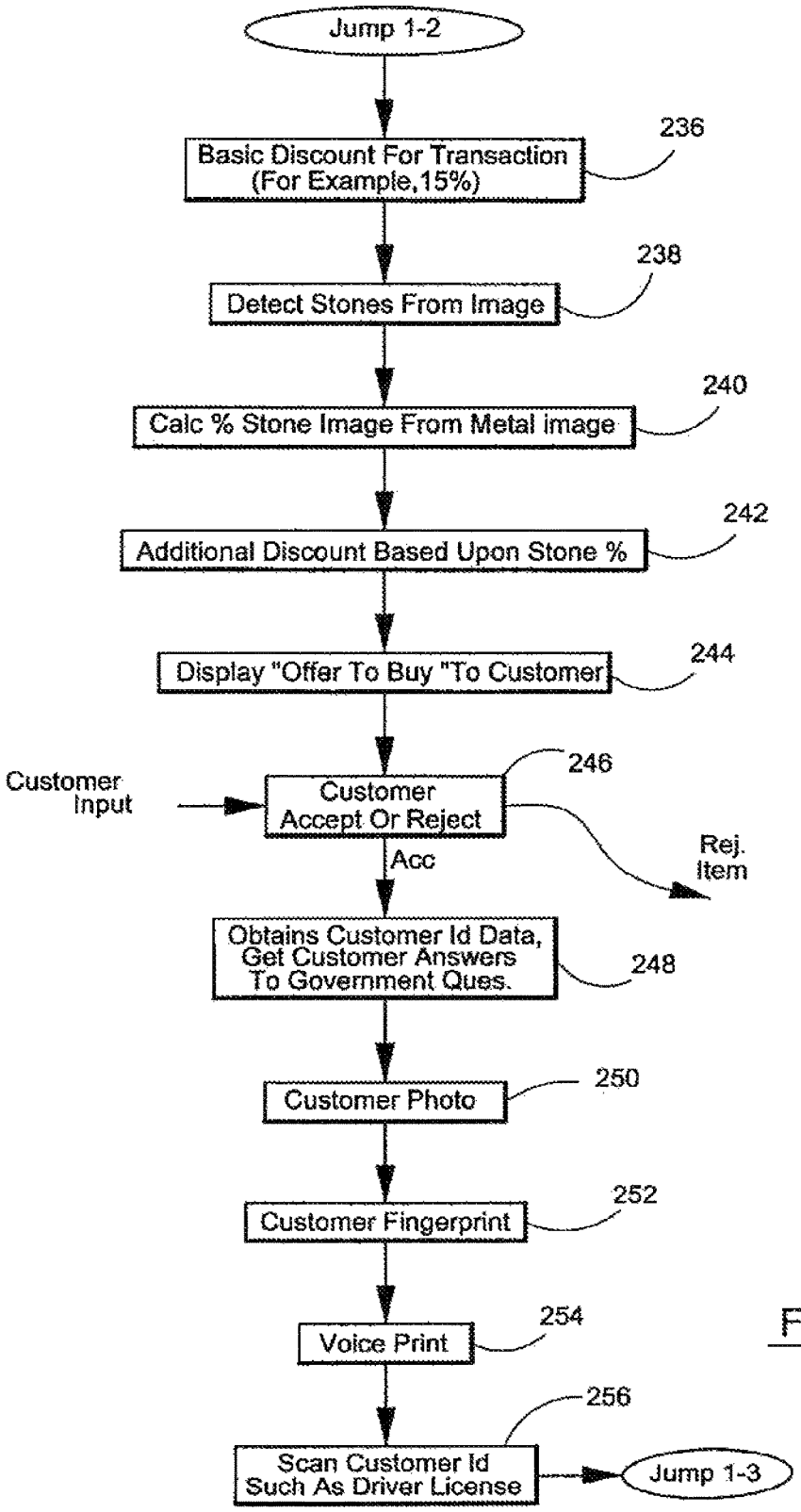

FIG. 6B is coupled to FIG. 6C by jump point 1-2. In step 236, the system discounts from the calculated value of the piece a certain percentage for transaction cost, fraud and other market conditions and operating system or transaction fee costs. As an example, the system may discount the actual price of the precious metal item under study by 15%. The 15% represents profit to the system operator, a set aside reserve for fraud and other transactional costs. A volume error factor may be an additional discount. Step 238 detects the number and size of stones in the image. This is done by obtaining one or more photographs, conducting edge analysis and light reflection analysis and also determining stones by common shapes such as round, oval, marquis, and other image processing techniques. In step 240, the percent of stone image is determined as a ratio of the volume of the piece under study which volume is estimated from step 226. In step 242, the system applies an additional discount to the value of the piece under study due to the presence of stones or jewels. In step 244, an offer to buy is presented to the customer. The offer to buy should be commensurate with similar offers in the local jewelry and pawn business.

When the offer to buy is presented to the customer in step 244, the customer engages and applies an input into the machine 51 and the method in step 246 requires that the customer either accept or reject the item. If the item is rejected, the piece under study is delivered back to portal 54, the lockout door 56 is opened and the customer is permitted to remove piece 55 from the machine. If the customer accepts the offer to buy, in step 248 certain information is obtained from the customer. This information includes identity information, further images and photographs of the customer, credit card information, a fingerprint of the customer and potential an audio voice print of the customer. Therefore, scanner 64 may be used for a driver license scan. Fingerprint reader 68 captures the fingerprint of the user. The machine [50] *51* may also include a microphone to capture a voice print. Camera 60 captures several images of the customer. Therefore, steps 250, 252, 254 and 256 gather all this customer data. The customer data is put in a customer profile which documents all offers and all attempted sales by prospective customers (a fraud detection function). Jump point 1-3 in FIG. 6C leads to FIG. 6D.

Figure 6D:
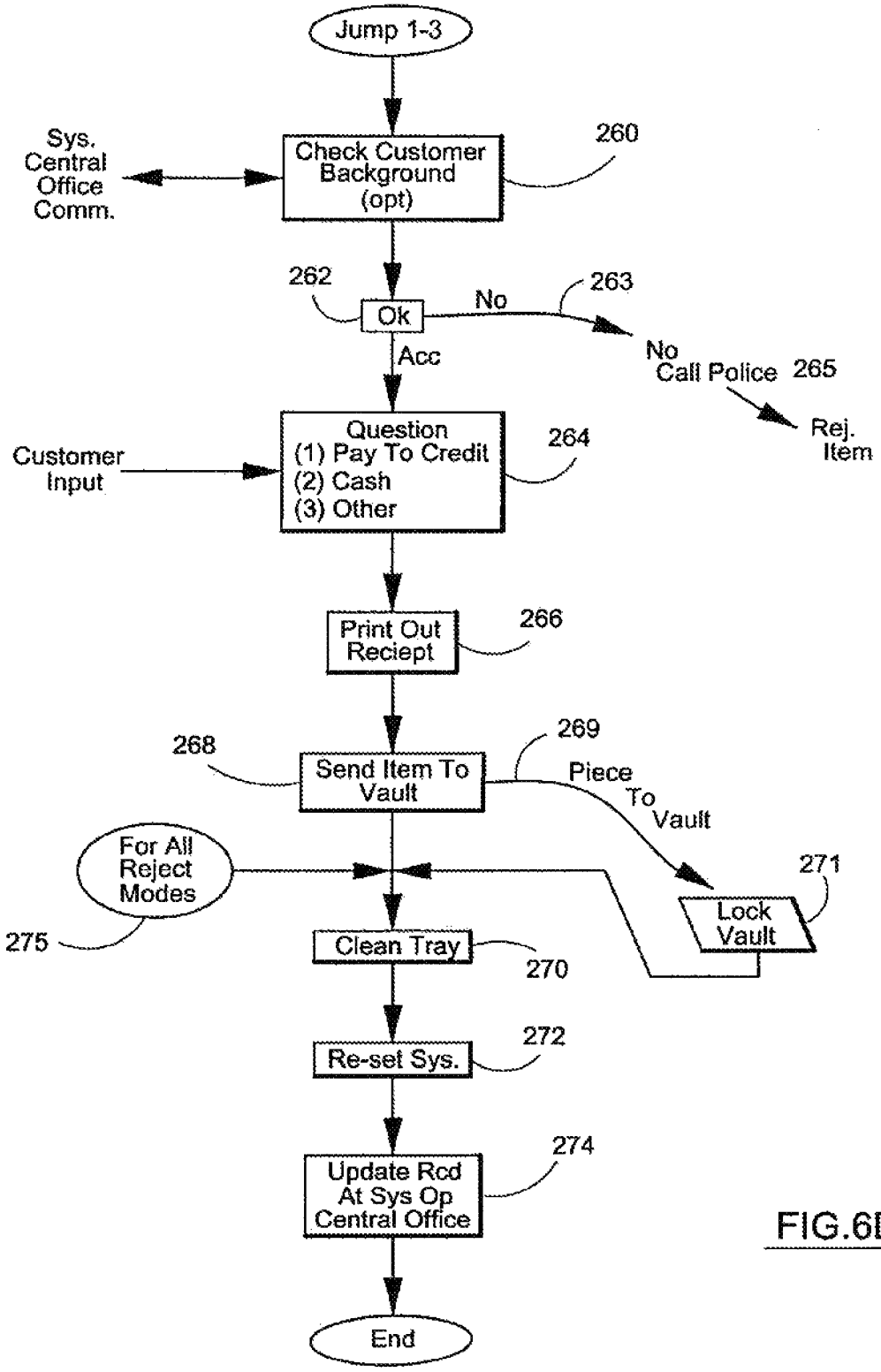

In FIG. 6D, step 260 checks the customer against a potential list of felons. This may involve a communication with the central office as discussed earlier in connection with FIG. 1. This background check in step 260 is optional. Step 262 determines, either by the system operator at the central office or based upon information stored in machine [50] *51*, whether the transaction is acceptable. If not, the NO step is taken at path 263 and, optionally, the police are called in step 265 and the item is rejected. A police call in step 265 may be reasonable if the item under study matches data associated with stolen piece database. If the system accepts the background check from step 262, the system executes step 264 which requires the customer to input information regarding how the customer is to be paid. The customer has several options. He or she may be paid by a credit applied to a credit card or a debit card. The credit card or debit card is read by credit card reader 70. Alternatively, machine [50] *51* may have a cash dispenser 72 which dispenses cash. In any event, step 266 prints out a receipt for the customer by printer 74. In step 268, the item under study is placed in vault as noted by vault route 269. Step 271 locks the vault for secure storage. Step 270 cleans the operating [tray] *platform* (*tray*) such that any gold dust from previous operations is no longer affecting the weight of newly submitted items. In FIG. 5, station 4 at time t-8, fan 140 is operated which blows the gold dust from operation platform 135. Other techniques and methods for cleaning tray 135 may be utilized. For all other rejected modes as noted in step 275, the tray is cleaned. In step 272, the system is reset. In step 274, an update is provided to the central office regarding the completed transaction. Further, customer profile data may be uploaded to the central location.

The GBM can be configured to process gold, silver, and platinum. Therefore, all references herein to gold are equally applicable to other precious metal. The following table lists examples of items to be tested and potentially purchased at the GBM. Some weight and volume and size limits apply.

| |
|---|
| Bracelets |
| Necklaces |
| Rings |
| Pendants |
| coins |
| Brooches |
| cuff links |
| Earrings |
| Bullion |
| Gold Bars |
| Eating Plates |
| Knives |
| Forks |
| Spoons |
| Pins (large ornamental jeweled pins) |
| Money clip |
| body Jewelry (piercing) studs, rings |
| Dental teeth |
| gold, silver, or platinum |

Currently, item size limits are 3 inches maximum, ⅙ inches minimum; minimal size limits: ¼ inch length, ¼ inch height, ¼ inch depth; maximum size limits: 3 inches, 12 inches in length, 6 inches in height; and weight limits are 1 g. to 1-2 kg.

Since stones weigh less, they do not greatly effect the value of the piece. If the stones are less than 20% of the volume (estimated by the photo images), then an additional discount of 5% is not unreasonable. If stones are more than 20% of the volume, the piece may be rejected by the system. The fraud typically arises with a weight that is greater than the computed estimated weight based upon gold % and an estimated volume.

Gold buying parameters include: the current (daily posted, weekly average or monthly average) price of gold, the discount rate for the gold buying system and the transaction fee for particular gold buying machine.

Throughout the description of the present method and system, abbreviations are sometimes utilized describing certain features. The following Abbreviations Table lists these items.

ABBREVIATIONS TABLE

| | |
|---|---|
| w, h, d | width, height, weight |
| acc | accepted, such as a customer accepts an offer to buy |
| admin | administrator |
| ASP | application service provider - server on a network |
| API | application program interface |
| ad | advertisement |
| bd | board |
| calc | calculate |
| cam | camera, maybe a common camera or an x-ray camera |
| cat | category |
| CD-RW | compact disk drive with read/write feature for CD disk |
| ck | check or confirm |
| comm. | communications, typically telecommunications |
| CPU | central processing unit |
| cmd | command |
| cnt | content |
| cr cd | credit card or debit card |
| db | [data base] *database* |
| disp | display or code |
| disp'r | dispenser, such as a unit to dispense or return the item |
| doc | document |
| dr | drive, e.g., computer hard drive |
| descrpt | description |
| dy | day |
| equip | equipment |
| empl'r | employer |
| empl'ee | employee |
| ent | entertainment (while the GBM operates, entertainment may be displayed to the customer |

-continued

ABBREVIATIONS TABLE

| | |
|---|---|
| err | error |
| est | estimate |
| freq | frequency |
| fnc | function, as in system function |
| geo | geographic location or code |
| gen | general |
| gov'nt | government, as in government regulations |
| hist | historic as in historic session records |
| id | identity card |
| I/O | input/output |
| IP | Internet Protocol such as IP address |
| iner | increase or increment |
| K | karat as in a Karat of gold |
| kypd | keypad, maybe mechanical or virtual, touch screen keys |
| loc | location |
| max | maximum |
| mem | memory |
| mess | message as in SMS or text message |
| mgr | manager |
| min | minimum |
| mth | month |
| obj | object, for example, a data object |
| opt | optional step or module |
| pgm | program |
| P/W | password |
| Pg | web page |
| pix | picture, usually digital picture or image |
| pmt | payment |
| pmpt | prompt, as in prompt a user to input data |
| pp impress | per page impression or view |
| pm n | print |
| prnt | printer or to print |
| Q | quantity |
| quest | question |
| rcd | database record or record profile |
| re | regarding or relating to |
| read | a reader, such as a credit card reader |
| reg'd | registered as in reg'd user |
| rej | reject |
| rel | relevancy or relevant |
| reqt | request |
| rev | review |
| rpt | Report |
| sch. | search |
| sched | schedule |
| sel | select or selector |
| si | sillets interface modules |
| sig cond | signal conditioner |
| st | station |
| sys | system |
| sys oper | system operator |
| sess. | session |
| t | time |
| tele-com | telecommunications system or network |
| TS | time, date stamp |
| txt | text |
| URL | Uniform Resource Locator, x pointer, or other network locator |
| vid | video |
| vol | volume |
| wk | week |
| wt | weight |

FIG. [1A] *7* diagrammatically illustrates the global telecommunications system or Internet 10 which enables communication and data transport between a plurality of relatively independent GBM computer systems 12, [14, 16, 17] *14a, 16a*, 18 and 20. Communications System 10 may include cellular or wireless comm channels to the gold buying machines. [A] *As* indicated earlier, each gold buying machine includes a computer system, therefore, systems [14, 16] *14a, 16a* in FIG. [1A] *7* depict the computer [system sin] *systems in* the gold buying machines. Computer system 12 includes monitor 22, input device or keypad 24, input device or mouse 26, and processor unit 28. Processor unit 28 includes a central processing unit or CPU 30, memory 32 and an input/output or I/O device 34. It should be appreciated that memory 32 represents many types of data storage including hard drives, volatile and non-volatile memory, and removable drives. Also, I/O 34 represents a plurality of input/output devices which are utilized to couple items which are peripheral to processing unit 28. I/O 34 is connected to Internet 10. [Computer 17 is a laptop computer which can easily be disconnected from Internet 10.] Computer 18 is an administrative computer which assists in the overall control and operation of the system by the Sys Op and the method described herein.

In a preferred embodiment, the system and method are deployed on Internet 10 via computer system server 20. The telecom system may be wired, wireless or a combination of both. Server 20 includes CPU 36, memory 38 and I/O 40, and is coupled to Internet 10.

In a different embodiment of the present invention, the system or processing system or method may be partially or entirely carried out with the use of a telephone communications center 42. The telephone communications center typically includes one or a plurality of computers 44 and one or more telephones 46. Human operators may answer telephone inquiries from a customer at a gold buying machine. Also, the Tele Comm may be fraud detection system which in real time can stop the gold buying transaction.

For example, once the customer's id is scanned by the gold buying machine, if the id matches a "wanted criminal" in a database (as posted by the police authority), then the Tele Comm center may cancel a gold buying transaction in the middle of the transaction. Also, the Tele Comm Center may notify police of the incident.

The input of information can be facilitated by a person at telephone [communication] *communications* center 42. For example, computer 44 could display questions which the operator could audibly present via telephone 46 to a caller. The operator would input into computer 44 the caller's answers and [system 44] *communications center 42* could generate appropriate responses to complete data entry forms for the system.

The information obtained by computer 12 is generally stored in server 20. Thereafter, the information is processed by server 20 and the output information representing processed data is delivered via Internet 10 or Tele Comm Sys 10, and ultimately to computer 12, [14, 16] *14a, 16a*. FIG. [1B] *7* shows that data input by a customer is sent to the server 20 which returns further web page data [A4]. The web page may be informational to the buyer at the gold buying machine.

Although the system and method is described generally for use in conjunction with Tele Comm Sys 10, the system and method could be utilized by a single computer, such as laptop operated by a Sys Op or a jewelry store or pawn shop owner. [Laptop 17] *The laptop* could be utilized with a CD-ROM storing a major portion of the [data bases] *databases* necessary to carry out the principles of the present invention. Further, the information processing system could be deployed over a local area network or a wide area network or utilized exclusively in-house by a single company with subsidiaries bidding for a gold buy.

Discussion of Hardware and Software Implementation Options

The present invention could be produced in hardware or software, or in a combination of hardware and software, and these implementations would be known to one of ordinary skill in the art. The system, or method, according to the inventive principles as disclosed in connection with the preferred embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as a local area network (LAN) or widely distributed network (WAN) over a telecommunications system (such as the Internet) as would be known to a person of ordinary skill in the art.

According to the inventive principles as disclosed in connection with the preferred embodiments, the invention and the inventive principles are not limited to any particular kind of computer system but may be used with any general purpose computer, as would be known to a person of ordinary skill in the art, arranged to perform the functions described and the method steps described herein. The operations of such a computer, as described above, may be according to a computer program contained on a medium for use in the operation or control of the computer, as would be known to person of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM or other optical memory storage devices, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

The claims appended hereto are meant to cover modifications and changes within the scope and spirit of the present invention.

What is claimed is:

[1. A machine for buying gold-bearing items from consumers, the machine coupled to a central office via a telecommunications system for tracking the purchase of gold-bearing items and related transactions by the machine and providing updates relative to the exchange rate market price data for gold to the machine, comprising:

a secure;

a vault within the housing;

a portal in said housing leading inboard to a processing platform and a plurality of processing stations in the interior of said housing, said processing platform adapted to retain said gold-bearing item as deposited through said portal;

said plurality of processing stations including: a weigh station to weigh said gold-bearing item, an imaging station for capturing images of the item, an assaying station for testing a purity of gold in said item, and a conveyor means for delivering a purchased item to said vault, said weigh station, imaging station and assaying station respectively generating representative signals for weight, item images and assaying data;

a plurality of seller interface modules on and about an exterior of said housing including a display, an imaging system to capture one or more images of said seller, at least one scanner for obtaining seller's identity or biometric data, a keypad input interface and a bank card reader adapted to read a seller's bank card linked to a seller's account to be credited for the sale of said gold-bearing item;

a control processor electronically obtaining respective weight, item images and assaying signals from said processing stations and being disposed within said secure housing, said control processor:

an input output module to said central processor and further coupled, via said telecommunications system, to said central office to obtain exchange rate data for said gold from said central office and outputting said exchange rate data to said central processor;

a calculator module as part of said central processor determining a discounted market value for said gold-bearing item based upon said exchange rate data, said weight signals, said assaying data, and discount factors;

a compiler as part of said central processor, coupled to said display to compile and present instructions regarding acceptance and rejection, and an offer to buy the item at the discounted market value;

said compiler obtaining and storing seller's data from said seller interface modules including seller responsive data from said instructions and including seller images and scanner data for seller's identity and biometric data, said compiler also storing transactional data;

an acceptance module as part of said central processor adapted to initiate a credit for the seller's account based upon a seller's confirmation of sale from said seller interface module;

said conveyor coupled to said acceptance module, delivering the purchased item to said vault upon confirmation of sale;

a rejection module adapted to negate said acceptance module upon either a seller's request from said seller interface modules or a detected error signal; and, an error module, as part of said central processor, for generating the error signal based upon one or more of: a gold purity fault, a weight fault, a discounted market value fault, and an item size fault;

said compiler storing said error signal with said seller data.]

[2. A machine for buying gold-bearing items as claimed in claim 1 wherein said input output module includes a transaction module to effect the credit to the seller's account based upon said seller's confirmation and the delivery of the gold-bearing item to the vault via said acceptance module and to monitor seller's data, confirmation, a seller's request to reject the transaction and error signals.]

[3. A machine for buying gold-bearing items as claimed in claim 2 wherein said compiler presenting a buy-sell contract to said seller and operational instructions for said machine via said display; and wherein the seller responsive data being stored via said compiler.]

[4. A machine for buying gold-bearing items as claimed in claim 3 wherein said error module includes:

an estimating module that estimates a volume of said item based upon said images of the item;

a distinguishing module that distinguishes non-metallic elements of said item from gold elements and estimates a differential volume therebetween; and a volume error module that generates a volume error based upon the differential volume and a predetermined volume threshold, said volume error being an item size fault.]

[5. A machine for buying gold-bearing items as claimed in claim 3 wherein said error module includes:

an error calculator computing an estimated weight based upon a gold purity value from said assay signals;

a comparison module comparing the estimated weight and the weight signals from said weigh station and generating the gold purity fault when a differential between the estimated weight and the weight signals is beyond a predetermined weight-purity threshold.]

[6. A machine for buying gold-bearing items as claimed in claim 3 wherein said discount factors include factors related to transaction fees, fraud-related factors and the presence of non-gold elements in said gold-bearing item;

said calculator determining the discounted market value of the item includes:

an estimating module that estimates a volume of said item based upon said images of the item;

a distinguishing module that distinguishes non-metallic elements of said item from gold elements and estimates a differential volume therebetween;

a first discount factor module for changing a discount factor of non-gold elements based upon the differential volume and a predetermined volume threshold;

an error calculator computing an estimated weight based upon a gold purity value from said assay signals;

a comparison module comparing the estimated weight and the weight signals from said weigh station; and a second discount factor module for changing a discount factor for fraud when a differential between the estimated weight and the weight signals is beyond a predetermined weight-purity threshold.]

[7. A machine for buying gold-bearing items as claimed in claim 3 wherein said plurality of seller interface modules include a scanner for a seller's government issued identification and a fingerprint scanner, the identification scanner capturing for a seller's identifiable image and the fingerprint scanner capturing finger biometric data, said finger biometric data and seller's identifiable image being said seller's identity and biometric data which is stored via said compiler.]

[8. A machine for buying gold-bearing items as claimed in claim 3 including a lock-out door operative to close said portal and a door actuator, said door actuator closing said door when said control processor and said complier via said display presents said instructions, and said door actuator opening said door under the control of said rejection module.]

[9. A machine for buying items containing gold, silver or platinum from consumers, the machine coupled to a central office via a telecommunications system for tracking the purchase of precious metal-bearing items and related transactions by the machine and providing updates relative to the exchange rate market price data for precious metal to the machine, comprising:

a secure housing;

a vault within the housing;

a portal in said housing leading inboard to a processing platform and a plurality of processing stations in the interior of said housing, said processing platform adapted to retain said item as deposited through said portal;

said plurality of processing stations including: a weigh station to weigh said item, an imaging station for capturing images of the item, an assaying station for testing a purity of precious metal in said item, and a conveyor for delivering a purchased item to said vault, said weigh station, imaging station and assaying station respectively generating representative signals for weight, item images and assaying data;

a plurality of seller interface modules on and about an exterior of said housing including a display, an imaging system to capture one or more images of said seller, at least one scanner for obtaining seller's identity or biometric data, a keypad input interface and a bank card reader adapted to read a seller's bank card linked to a seller's account to be credited for the sale of said gold-bearing item;

a control processor electronically obtaining respective weight, item images and assaying signals from said processing stations and being disposed within said secure housing, said control processor;

means for communicating with said central office to obtain exchange rate data for said precious metal from said central office and outputting said exchange rate data to said control processor;

means for determining a discounted market value for said precious metal-bearing item based upon said exchange rate data, said weight signals, a purity based upon said assaying data, and discount factors;

a calculator module as part of said control processor determining a discounted market value for said precious metal-bearing item based upon said exchange rate data, said weigh signal, said assaying data, and discount factor;

a compiler as part of said control processor, coupled to said display to compile and present instructions to the seller regarding acceptance and rejection, and an offer to buy the item at the discounted market value;

said compiler obtaining and storing seller's data from said seller interface modules including seller responsive data from said instructions and including, seller images and scanner data for seller's identity and biometric data, said compiler also storing transactional data;

said compiler via said display presenting information related to the purchase of the item and government-related inquiries regarding the transaction to said seller, and said compiler thereafter capturing seller responsive government-related inquiry data in said compiler;

an acceptance module as part of said control processor adapted to initiate a credit for the seller's account based upon a seller's confirmation of sale from said seller interface modules; and said conveyor, coupled to said acceptance module, delivering the purchased item to said vault upon confirmation of sale;

a rejection module adapted to negate said acceptance module upon either a seller's request or a detected error signal; and, an error module for generating the error signal based upon one or more of: a precious metal purity fault, a weight fault, a discounted market value fault, and an item size fault; and said compiler storing said error signal with said seller data.]

[10. A machine for buying items as claimed in claim 9 wherein said means for communicating with said central office includes a transaction module to effect the credit to the seller's account based upon said seller's confirmation and the delivery of the item to the vault via said acceptance module and to monitor seller's data, confirmation, a seller's request to reject the transaction and error signals; and wherein said complier presenting a buy-sell contract to said seller and operational instructions for said machine via said display; and wherein the seller responsive data being stored via said compiler;

the machine including a lock-out door operative to close said portal and a door actuator, said door actuator closing said door when said control processor and said complier via said display presents said instructions, and said door actuator opening said door under the control of said rejection module.]

[11. A machine for buying items as claimed in claim 10 wherein said discount factors include factors related to transaction fees, fraud-related factors and the presence of non-precious metal elements in said item;

said calculator determining the discounted market value of the item includes;

an estimating module that estimates a volume of said item based upon said images of the item;

a distinguishing module that distinguishes non-metallic elements of said item from precious metal elements and estimates a differential volume therebetween;

a first discount factor module for changing a discount factor of non-precious metal elements based upon the differential volume and a predetermined volume threshold;

an error calculator computing an estimated weight based upon a precious metal purity value from said assay signals;

a comparison module comparing the estimated weight and the weight signals from said weigh station; and a second discount factor module for changing a discount factor for fraud when a differential between the estimated weight and the weight signals is beyond a predetermined weight-purity threshold.]

[12. A method for buying gold-bearing items from consumers comprising:

providing a secure housing, a vault disposed in the housing, said housing having a portal adapted to be closed, said portal leading inboard to a plurality of processing stations in the interior of said housing;

providing an assaying tool in said housing;

in said secure housing while said portal is closed: weighing said gold-bearing item, capturing images of the item, and testing a purity of gold with said assaying tool;

at an exterior location near said housing: capturing one or more images of said seller, scanning and obtaining seller's identity or biometric data and obtaining a seller's bank card data, which bank card is linked to a seller's account to be credited for the sale of said gold-bearing item;

obtaining updates relative to an exchange rate market price data for gold;

electronically obtaining the weight and assay data about said item;

with a computer processing system:

determining a discounted market value for said gold-bearing item based upon said exchange rate data, weight of the item, a purity based upon said assaying data, and discount factors;

electronically presenting instructions regarding acceptance and rejection to a seller of said item, and presenting an offer to buy the item at the determined market value;

electronically presenting information related to the purchase of the item and government-related inquires regarding the transaction to said seller;

storing images of said seller, said seller's identity and biometric data and bank card data, the seller's responses to the government-related inquiries and also storing transactional data, all as seller data;

obtaining a confirmation or sale from said seller and thereafter effecting the deposit of the item into said vault;

obtaining a rejection from said seller and thereafter effecting the return of the item to the seller; and negating any acceptance of the item due to an error based upon one or more of: a gold purity fault, a weight fault, a discounted market value fault, and an item size fault; and storing an indication of an error with said seller data.]

[13. A method for buying gold-bearing items as claimed in claim 12 including opening the portal while returning the item to the seller.]

[14. A method for buying gold-bearing items as claimed in claim 13 including rejecting the item and returning the time to the seller if: the item weighs too much, or if the volume of the item is either too large or too small, or if the non-metallic elements of the item compared to the gold-bearing elements of the item are too large, or if a gold purity fault is determined based upon a differential between an estimated gold purity weight and the item's weight exceeds a threshold wherein the estimated gold purity weight is based upon an estimated volume of the item calculated by the volume of item as per the item's images.]

[15. A method for buying gold-bearing items as claimed in claim 14 including discounting the market value of the gold-bearing item due to fraud and transaction fees.]

[16. A method for buying gold-bearing items as claimed in claim 14 initiating a credit payment to said seller's account upon confirmation of said sale of said item.]

17. A method for buying [items] *a precious metal-bearing item* containing gold, silver or platinum [items] from [consumers] *a seller* comprising:

providing a secure housing, a vault disposed in the housing, said housing having a portal adapted to be closed, said portal leading inboard to a plurality of processing stations in the interior of said housing;

providing an assaying tool for precious metal in said housing;

in said secure housing while said portal is closed: weighing said [precious metal-bearing] item, capturing [images] *an image* of the item, and testing a purity of precious metal with said assaying tool *to obtain assay data*;

at an exterior location near said housing: capturing one or more images of said seller, scanning and obtaining seller's identity *data* or *seller's* biometric data, and obtaining a seller's bank card data, which bank card is linked to a seller's account to be credited for the sale of said [precious metal-bearing] item;

obtaining updates relative to [an] exchange rate market price data for precious metal;

electronically obtaining [the] weight *data* and assay data [about] *for* said item;

with a computer processing system:

determining a discounted market value for said [precious metal-bearing] item based upon said exchange rate data, weight [of the item] *data*, a purity based upon said [assaying] *assay* data, and *a* discount [factors] *factor*;

electronically presenting instructions regarding acceptance and rejection to [a] *the* seller [of said item], and presenting an offer to buy the item at the [determined] *discounted* market value;

electronically presenting information related to the [purchase of] *offer to buy* the item and government-related inquires regarding the [transaction] *offer to buy* to said seller;

storing *said one or more* images of said seller, said seller's identity [and] *data or* biometric data, and *the* bank card data[,]*;*

[the] *obtaining and storing* seller's responses to the government-related inquiries and also storing transactional data;

obtaining a confirmation of sale from said seller and thereafter effecting [the] *a* deposit of the item into said vault[,]*;*

*alternative to the confirmation,* obtaining a rejection from said seller and thereafter effecting [the] *a* return of the [itemto] *item to* the seller; and negating [any acceptance of the item] *the confirmation of sale* due to an error based upon one or more of [a precious metal purity fault,] a weight fault[, a discounted market value fault,] and an item size fault; and storing an indication of [an] *the* error [with said seller data].

[18. A method for buying items as claimed in claim 17 including opening the portal while returning the item to the seller.]

[19. A method for buying items as claimed in claim 18 including rejecting the item and returning the time to the seller if: the item weighs too much, or if the volume of the item is either too large or too small, or if the non-metallic elements of the item compared to the precious metal-bearing elements of the item are too large, or if a precious metal purity fault is determined based upon a differential between an estimated gold purity weight and the item's weight exceeds a threshold wherein the estimated precious metal purity weight is based upon an estimated volume of the item calculated by the volume of item as per the item's images.]

[20. A method for buying items as claimed in claim 19 including discounting the market value of the precious metal-bearing item due to fraud and transaction fees.]

* * * * *